United States Patent
Rogers

(12) 
(10) Patent No.: US 6,360,108 B1
(45) Date of Patent: Mar. 19, 2002

(54) SYSTEM AND METHOD FOR THE AUTOMATIC PREPENDING OF DIGITS IN A WIRELESS COMMUNICATION DEVICE

(75) Inventor: John G. Rogers, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/046,319

(22) Filed: Mar. 23, 1998

(51) Int. Cl.$^7$ ............................................. H04M 1/38
(52) U.S. Cl. ........................ 455/564; 455/460; 455/575
(58) Field of Search ................................ 455/500, 501, 455/566, 90, 575, 564, 460, 550, 565

(56) References Cited

U.S. PATENT DOCUMENTS

| | | | |
|---|---|---|---|
| 5,274,693 A | * 12/1993 | WAldman | 455/564 |
| 5,305,372 A | * 4/1994 | Tomiyori | 379/59 |
| 5,455,858 A | 10/1995 | Lin | 379/355 |
| 5,459,774 A | * 10/1995 | Breeden | 379/354 |
| 5,592,546 A | 1/1997 | Takahashi | 379/355 |
| 5,722,088 A | * 2/1998 | Storn et al. | 455/564 |
| 5,797,098 A | * 8/1998 | Schroeder et al. | 455/464 |
| 5,917,904 A | * 6/1999 | Theis | 379/355 |
| 5,963,876 A | * 10/1999 | Manssen et al. | 455/564 |

FOREIGN PATENT DOCUMENTS

| | | | |
|---|---|---|---|
| WO | 9203882 | 3/1992 | .......... H04M/11/00 |
| WO | WO 94/22260 | * 9/1994 | |
| WO | 9422260 | 9/1994 | .......... H04M/11/00 |
| WO | WO 97/11546 | * 3/1997 | |
| WO | 9711546 | 3/1997 | .......... H04M/1/274 |
| WO | WO-99/48266 A1 | * 9/1999 | |

* cited by examiner

*Primary Examiner*—William Trost
*Assistant Examiner*—Tilahun Gesesse
(74) *Attorney, Agent, or Firm*—Philip R. Wadsworth; Roger W. Martin; Charles D. Brown

(57) ABSTRACT

A wireless communication device contains a prefix storage area containing one or more prefixes that may be automatically pre-pended to a destination telephone number. The destination telephone number may be entered manually by the user using a keypad or automatically entered from a telephone number storage area. The system analyzes the destination telephone number and determines whether one or more prefix pre-pending levels have been enabled. If enabled, the system automatically pre-pends the selected prefixes to the user-entered destination telephone number to generate a complete destination telephone number. The automatic pre-pending can extend to all telephone numbers entered by the user, or may be limited to telephone numbers in the telephone number storage area. Similarly, the system can be enabled continuously, or may be disabled when the user turns off the wireless communication device.

2 Claims, 4 Drawing Sheets of the present invention.

SYSTEM AND METHOD FOR THE AUTOMATIC PREPENDING OF DIGITS IN A WIRELESS COMMUNICATION DEVICE

BACKGROUND OF THE INVENTION

I. Field of Invention

The present invention is related generally to a wireless communication device, and more particularly, to a system and method for automatically pre-pending digits to destination telephone numbers.

II. Description of the Related Art

Wireless communication devices, such as cellular telephones, are widely used as a replacement for conventional telephone systems. In addition to functioning as a replacement for a convention telephone, wireless communication devices offer the advantage of portability, thus enabling the user to establish a wireless communication link from almost any location on Earth to almost any other location on Earth.

To establish a communication link using a typical wireless communication device, the user enters the desired destination telephone number (e.g., 555-1234) and presses a "SEND" button. Frequently used telephone numbers may be stored in a speed dialing storage area within the wireless communication device. To establish a communication link with a telephone whose number is stored in the speed dialing storage area, the user simply recalls the desired speed dialing location and presses the SEND button.

One disadvantage of the conventional wireless communication device is that the user must manually enter additional prefix digits when making a long-distance call. For example, if a speed dial storage location is programmed with the telephone number 555-1234, the telephone number in the speed dial location may be used directly only when the wireless communication device is within the same geographic region (e.g., area code) as the destination telephone number. For example, if the destination telephone number 555-1234 is in the San Diego area and has an area code of 619, the user can utilize the telephone number in the speed dial storage location only when the user is also within the 619 area code. However, if the user travels to Seattle, for example, the user must manually enter the entire telephone (e.g., 619 555-1234).

Some prior art wireless communication systems include an edit mode that permits the user to manually pre-pend digits to existing telephone numbers in the speed dial storage locations. However, such a system is cumbersome because the user must enter the edit mode, manually add the desired digits, and exit the edit mode prior to initiating the wireless communication link. Furthermore, the user must manually edit the data in each speed dial location every time a call is initiated.

Therefore, it can be appreciated that there is significant need for a system and method to automatically pre-pend digits to destination telephone numbers in a wireless communication device to thereby provide a complete destination telephone number. The present invention provides this and other advantages as will be illustrated by the following description and accompanying figures.

SUMMARY OF THE INVENTION

The present invention is embodied in a system and method for automatically pre-pending digits in a wireless communication device. In an exemplary embodiment, the system includes a keypad input device to allow the user to enter a destination telephone number. A memory contains a plurality of prefixes and a user-controllable enable signal selectively enables the pre-pending of prefixes in a predetermined sequence. A control processor automatically pre-pends a first sequential one of the plurality of prefixes to the user-entered destination telephone number to thereby generate a complete destination telephone number.

In some cases, the predetermined sequence can include a second prefix. In this situation, the control processor automatically pre-pends the second sequential one of the plurality of prefixes to the user-entered destination telephone number. The system may also include a speed-dial storage area to store a plurality of destination telephone numbers. The user-entered destination telephone number is selected from the speed-dial storage area. In one embodiment, at least a portion of the prefixes are pre-programmed into the memory by a service provider. Alternatively, at least a portion of the prefixes may be pre-programmed into the memory by the user.

In an exemplary embodiment, the system further includes a display to display the completed destination telephone number. The system can also include a transmitter to transmit the completed destination telephone number only if the user confirms the displayed destination telephone number by activating the keypad input device in a predetermined manner to thereby confirm the completed destination telephone number.

In one embodiment, the control processor will pre-pend the prefix to the user-entered destination telephone number in all subsequent calls to the user-entered destination telephone number until the control processor is disabled. The wireless communication device may have a power-on mode and a power-off mode. The control processor, when selectively enabled, pre-pends the prefix to the user-entered destination telephone number in all subsequent calls to the user-entered destination telephone number until the wireless communication device enters the power-off mode such that the control processor is disabled when the wireless communication device enters the power-off mode.

DETAILED DESCRIPTION OF THE PREFERRED EMBODIMENTS

The present invention provides a technique for automatically pre-pending one or more prefixes to a destination telephone number to thereby generate a complete destination telephone number. While the following description is directed primarily to operation of a cellular telephone communication system, it is clear that the principles of the present invention can be readily extended to any wireless communication system. As will be discussed in detail below, a typical telephone system in the United States requires the entry of seven digits for a complete local telephone number. To make a long-distance call, the user must pre-pend a three digit area code to the local destination telephone number. In some cases, the user must also pre-pend a "1" in front of the area code to indicate to the local telephone system that a long-distance call is being placed.

The present invention advantageously permits the user to define the desired pre-pended digits only one time and thereafter will automatically add the necessary pre-pended digits to thereby generate a complete destination telephone number. For purposes of the present discussion, a "complete" destination telephone number is one in which one or more prefix digits have been pre-pended to a partial destination telephone number to generate a destination telephone number which can be processed by the telephone system to complete the desired telephone call from the user's present location. For purposes of the present discussion, a "partial" destination telephone number is one in which the user-entered telephone number does not supply sufficient information to the telephone system to complete the desired telephone call from the user's present location. The present invention automatically pre-pends the necessary digits to the partial destination telephone number to thereby generate a complete destination telephone number.

Figure 1:
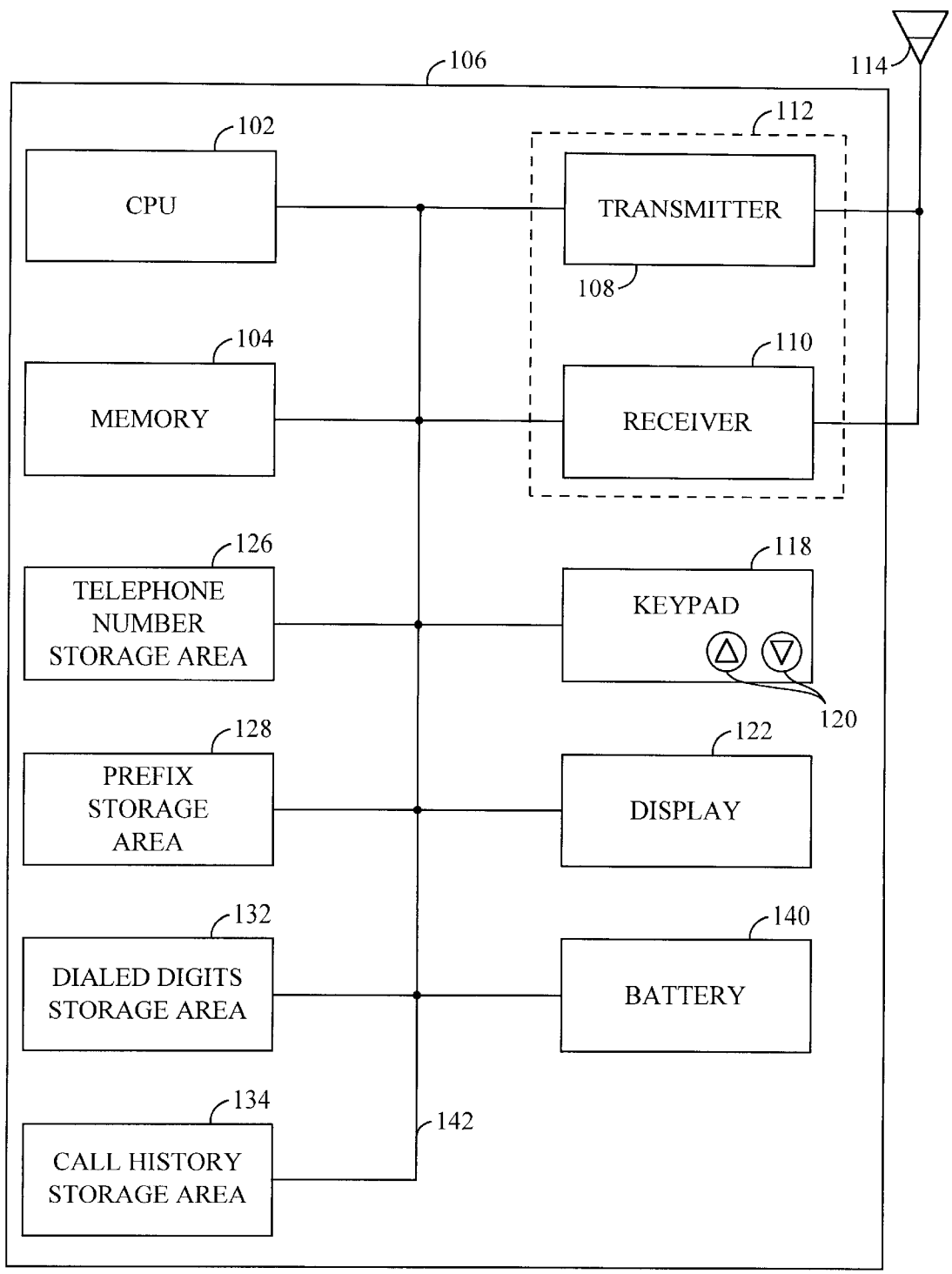
FIG. 1 is a functional block diagram of an exemplary embodiment of the wireless communication device of the present invention.

The present invention is embodied in a system 100 illustrated in the functional block diagram of FIG. 1. The system 100 includes a central processing unit (CPU) 102, which controls operation of the system. A memory 104, which may include both read-only memory (ROM) and random access memory (RAM), provides instructions and data to the CPU 102. A portion of the memory 104 may also include non-volatile random access memory. As will be discussed in greater detail below, the non-volatile random access memory portion of the memory 104 may be used to store one or more partial destination telephone numbers and one or more prefixes.

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a cell site controller (not shown). The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein.

A keypad 118 is attached to the housing 106 for operation by the user in a conventional manner. As will be described below, the keypad 118 provides a convenient input device by which destination telephone numbers may be entered by the user. The keypad 118 also includes one or more scroll buttons 120 that allow the user to sequentially move through the stored destination telephone numbers.

The system 100 also includes a display 122 that may conveniently used to display instructions to the user as well as user-entered data, such as destination telephone numbers. In an exemplary embodiment of the system 100, the display 122 will display a completed destination telephone number for the user prior to initiation of a telephone call.

The user-entered data, such as partial destination telephone numbers, are entered into the system 100 using the keypad 118 and are stored in a telephone number storage area 126, which is sometimes referred to as a speed-dial storage area. The telephone number storage area 126 may be included in the non-volatile memory portion of the memory 104 or may be a separate storage area. While depicted as a conventional memory, those skilled in the art can appreciate that the telephone number storage area 126 may be any suitable data structure.

When the user enters a partial destination telephone number or selects a partial destination telephone number from the telephone number storage area 126, the partial destination telephone number is supplemented by adding one or more telephone prefixes to generate a complete destination telephone number.

A prefix storage area 128 is used to store one or more prefixes that may be predefined by the telephone service provider, or added by the user. As will be discussed in detail below, the system 100 automatically selects one or more prefixes from the prefix storage area 128 and adds them to the partial destination telephone number to generate the complete destination telephone number.

The system 100 also includes a dialed digits storage area 132 to temporarily store the destination telephone number. The dialed digits storage area 132 receives the partial telephone number entered by the user via the keypad 118 if the user is manually entering the desired destination telephone number. However, the system 100 will automatically enter the partial destination telephone number selected from the telephone number storage area 126 into the dialed digits storage area 132 in response to the user selection one of the stored destination telephone numbers.

The complete destination telephone number is transferred to the dialed digits storage area 132. In operation, the transmitter 108 transmits the data in the dialed digits storage area 132 to initiate a telephone call to the destination telephone whose telephone number is stored in the dialed digits storage area.

A call history storage area 134 stores a predetermined number of previously dialed destination telephone numbers. For example, the call history storage area 134 may store the destination telephone numbers from the last ten phone calls. The data in the dialed digits storage area 132 is transferred to the call history storage area when a telephone call is initiated. The call history storage area 134 is conveniently used to recall previously dialed telephone numbers. In an exemplary embodiment, the complete destination telephone number is stored in the call history storage area 134. In an alternative embodiment, only the partial destination telephone number will be stored in the call history storage area 134. In this alternative embodiment, the user can selectively control whether the additional prefix digits will be pre-pended to the partial destination telephone number if using destination telephone numbers stored in the call history storage area 134.

The components of the system 100 are powered by a battery 140. In an exemplary embodiment, the battery 140 is a rechargeable battery. Alternatively, the system 100 may be powered by an external source, such as an AC adapter (not shown), an automobile power supply adapter (not shown), or the like.

The various components of the system 100 are coupled together by a bus system 142, which may include a power bus, control signal bus, and status signal bus in addition to a data bus. However, for the sake of clarity, the various buses are illustrated in FIG. 1 as the bus system 142.

The system 100 operates by analyzing the partial destination telephone number and, if enabled, automatically adding the appropriate prefix to generate the complete destination telephone number. As can be appreciated by those skilled in the art, the system 100 can be selectively enabled and disabled by appropriate commands to the CPU 102, such as may be generated in response to information shown on the display 122. In an exemplary embodiment, the system 100 permits selective activation or enabling of each of a plurality of sets of prefix digits stored in the prefix storage area 128. For example, the user can enter the digits 619 into the prefix storage area 128. The prefix digits 619 correspond to the area code for the San Diego area. At a subsequent time when the user may be traveling outside the San Diego area, the user may wish to pre-pend the digits 619 to a destination telephone number. The user may, by way of example, recall the partial destination telephone number 555-1234 from the telephone number storage area 126 and selectively enable the use of the prefix digits 619.

Once enabled, the system 100 will automatically add the prefix digits 619 whenever the user selects the telephone number 555-1234 from the telephone number storage area 126. In an exemplary embodiment, the system 100 is continuously enabled and will add the prefix digits 619 whenever the user selects the telephone number 555-1234 from the telephone number storage area 126. In this embodiment, the prefix digits 619 will only be added to the partial destination telephone number 555-1234 when extracted from the telephone number storage area 126. The system 100 may also be configured to add the prefix digits 619 if the user manually enters the partial destination telephone number 555-1234 while the prefix digits 619 are enabled. In this embodiment, the system 100 compares the partial destination telephone number entered by the user with a list of enabled prefix digits and thereby automatically adds the prefix digits 619.

In yet another alternative embodiment, the system 100 is enabled only while the wireless communication device is turned on. A power cycle (i.e., turning the wireless communication device off and on) will cause the enable signal to reset to a default disabled status. It should be noted that this will not erase any previously entered prefix digits in the prefix storage area 128, but merely disables the automatic pre-pending of digits from the prefix storage area.

In yet another alternative embodiment, the system 100 automatically pre-pends the digits from the prefix storage area 128 for any seven digit partial destination telephone number manually entered by the user via the keypad 118 or recalled from the telephone number storage area 126. This embodiment is useful because most telephone numbers entered by the user are within a single area code. When the user travels to a location outside the user's home region, the system may appropriately assume that all telephone numbers called by the user are to be considered partial destination telephone numbers, which will automatically be modified by the system 100 to include the pre-pended digits. The user may disable the automatic pre-pending of digits on a call-by-call basis if the user wishes to make a local call while traveling.

An example of the multiple levels of prefixes in the prefix storage area 128 is provided in Table 1 below.

TABLE 1

| Prefix Level | Prefix | Destination Telephone Number |
| --- | --- | --- |
|  |  | 5-1234 |
| Level 1 | 55 | 555-1234 |
| Level 2 | 619 | 619 555-1234 |
| Level 3 | 0 | 0 619 555-1234 |

In some telephone systems, the user need only enter a five digit extension telephone number to place a call. During programming of the automatic pre-pending feature, the user can enter the number of digits that the system 100 should expect (e.g., 5 digits, 7 digits, etc.). As can be appreciated by those skilled in the art, the number of digits required to complete a call can vary in different cities and countries. In the example illustrated in Table 1, the user enters the five digit extension number 5-1234. The Level 1 prefix is 55 which may be added to the five digit extension number to generate a complete destination telephone number that may be used to place a local call. If a Level 2 prefix is provided and enabled, the system 100 pre-pends the additional digits 619 for the area code, thus generating the destination telephone number 619 555-1234. Other multiple prefix levels may be implemented by the system 100. In Table 1, a prefix Level 3 includes the prefix 0, which is the country code for the United States. The system thus generates the complete destination telephone number 0 619 555-1234. The principles of the present invention may be extended to additional prefix levels if necessary. The number of prefix levels and the number of prefix digits in each prefix level is limited only by the size of the prefix storage area 128.

Figure 2A:
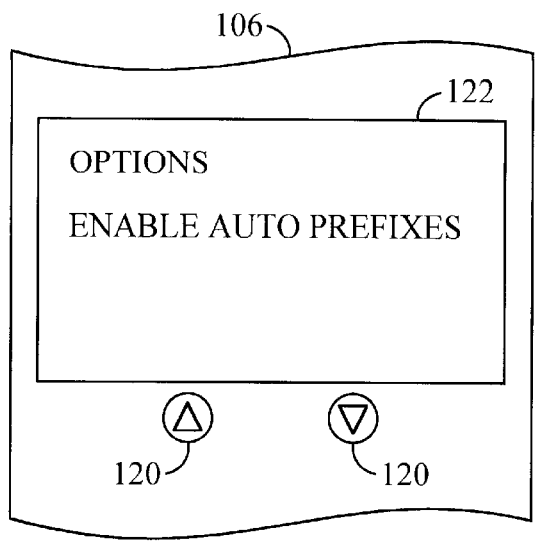
FIG. 2A illustrates a technique to enable the automatic pre-pending of prefixes by the wireless communication device of FIG. 1.
Figure 2B:
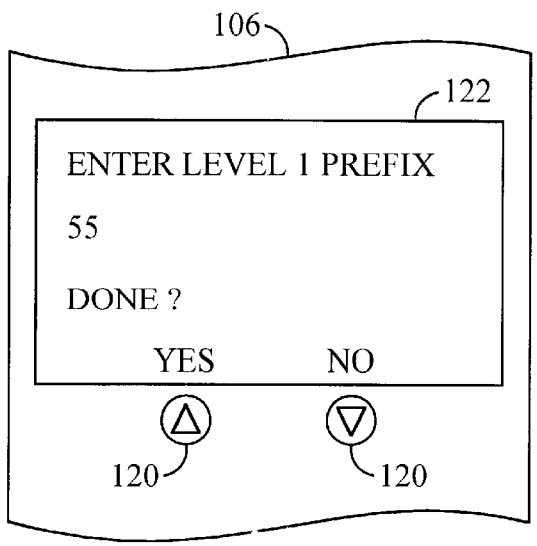
FIG. 2B illustrates the entry of prefix data by the wireless communication device of FIG. 1.
Figure 2C:
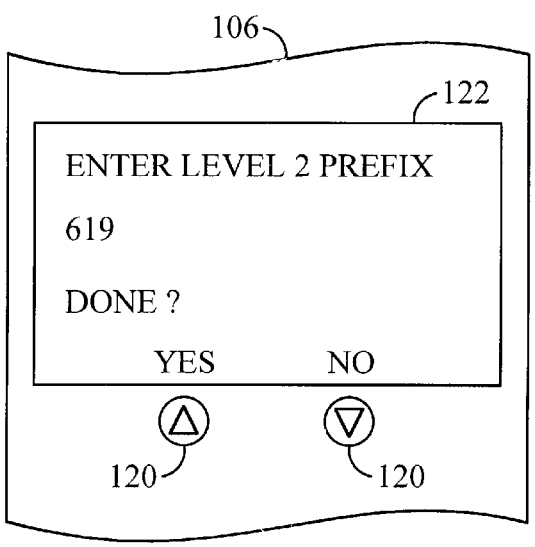
FIG. 2C illustrates the entry of additional prefix data by the wireless communication device of FIG. 1.

The operation of the system 100 to enable and enter prefixes is illustrated in FIGS. 2A to 2C. The use of options menus in wireless communication devices is well known. In FIG. 2A, the options list includes an "Enable Auto Prefixes" option, which is shown on the display 122. The user operates the up and down scroll buttons 120 to select the desired option and may press the SEND button (not shown) to enable the desired option. In response to the selection of Enable Auto Prefixes option, the system 100 displays a new message, illustrated in FIG. 2B. In response to the prompt on the display 122, the user enters the minimum number of digits the system should expect and a Level 1 prefix. In the present example, the system will expect at least 5 digits with the Level 1 prefix being the digits 55 in the example illustrated in Table 1. The user enters 55 on the keypad 118 (see FIG. 1) and confirms the selection by pressing the SEND button. In response to the user entry of the Level 1 prefix, the display 122 prompts the user to complete the automatic prefix selection by pressing the scroll button 120 under the YES prompt or to enter additional prefix levels by pressing the scroll button 120 under the NO prompt. If the user presses the scroll button 120 under the YES prompt, the system 100 moves to the display of FIG. 2C and allows the user to enter the minimum number of digits associated with a Level 2 prefix as well as the Level 2 prefix digits. Using the example of Table 1, the user enters 619 as a Level 2 prefix and presses the up scroll button 120 under the YES button to end the prefix entry and presses the down scroll button 120 under the NO button to enter additional prefix levels. This process can be repeated for multiple additional prefix levels.

In the exemplary embodiment discussed herein, the system analyzes the number of digits entered and determines whether an automatic pre-paid prefix is enabled for the number of digits entered. If enabled, the system automatically pre-pends the prefix digits for that level. This process can be repeated for multiple prefix levels. In the above example, if the user enters a 5 digit telephone number and has enabled the Level 1 prefix pre-pending, the system 100 will automatically enter the Level 1 prefix digits to generate a 7 digit telephone number. The system then checks to see if the current number of digits (i.e., the 7 digit telephone number) corresponds to the expected number of digits for a Level 2 prefix. If so, and the Level 2 prefix pre-pending is enabled, the system 100 automatically pre-pends the Level 2 prefix digits (e.g., 619) to the telephone number to generate a 10 digit telephone number. The process is repeated for additional prefix levels.

The example of Table 1 illustrates the entry of a five digit extension number as the partial destination telephone number initially entered by the user. In this example, the Level 1 prefix is 55 to form a complete seven digit local telephone number. However, the principles of the present invention may be readily applied to the use of a seven digit partial destination telephone number (e.g., 555-1234). In this example, the Level 1 prefix would be the area (e.g., 619). Thus, the system 100 offers great flexibility in generating a complete destination telephone number based on the partial destination telephone numbers entered by the user via the keypad 118 (see FIG. 1) or automatically entered from the telephone number storage area 126.

The example illustrated in Table 1 applies the calling rules used in the United States. However, it should be clear that the present invention is not limited only to the example of Table 1. For example, other countries have differing numbers of digits for local calls, long-distance calls, and international calls. In accordance with the principles of the present invention, the system 100 starts with a base number of digits and adds a variable number of additional digits in one or more prefix levels.

Figure 3:
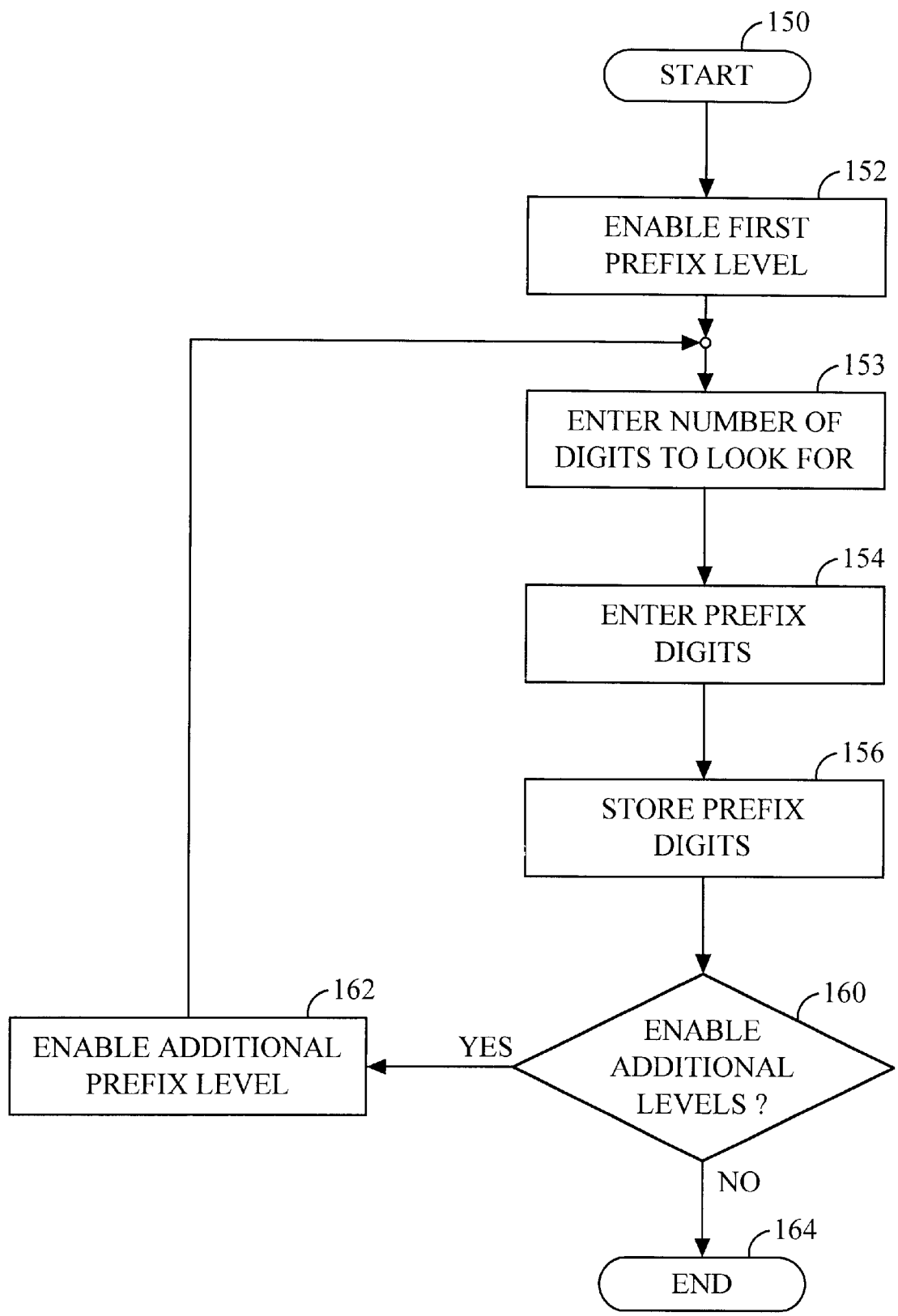
FIG. 3 is a flowchart of a technique used by the wireless communication device of FIG. 1 to enable automatic prefix pre-pending and to enter prefix data.

The operation of the system 100 to enter various prefix levels is illustrated in the flowchart of FIG. 3. At a start 150, the system 100 is under power. In step 152, the system 100 enables a Level 1 prefix. One example of a technique to enable a Level 1 prefix is illustrated in FIG. 2A where the user selects Enable Auto Prefixes option from an options menu. In step 153, the user enters the number of digits the system 100 should expect for Level 1 prefix pre-pending. It should be noted that the examples illustrated herein use a 5 digit telephone number and a 2 digit Level 1 prefix. However, the user may always enter a 7 digit telephone number. In this case, the Level 1 prefix may be a 3 digit area code. Thus, the present invention is not limited by the number of digits entered by the user nor the number of digits associated with any of the prefix levels.

In step 154, the user enters the desired prefix digits for the first level prefix. As discussed above, the number of digits in the partial destination telephone number and the number of digits in each prefix level is variable depending on the particular telephone system. For example, a three digit area code prefix can be added to a seven digit telephone number to generate a complete long distance telephone number for the United States. In step 156, the system 100 stores the user-entered Level 1 prefix digits in the prefix storage area 128 (see FIG. 1).

In decision 160, the system 100 determines whether the user wishes to enable additional prefix levels. This is illustrated in FIG. 2B where the user responds to a prompt on the display 122 by pressing the appropriate scroll button 120. If the user wishes to enable additional prefix levels, the result of decision 160 is YES. In that event, the system 100 enables the next additional prefix level in step 162 and returns to step 154 to permit the user to enter additional prefixes. The process of prefix digit entry and storage in steps 154 and 156 are repeated until the user has entered the appropriate additional prefix data. When the user has completed entering the prefix data, the result of decision 160 is NO. The system ends the process at 164 where one or more prefix levels have been enabled and data entered for each of the enabled prefix levels.

Figure 4:
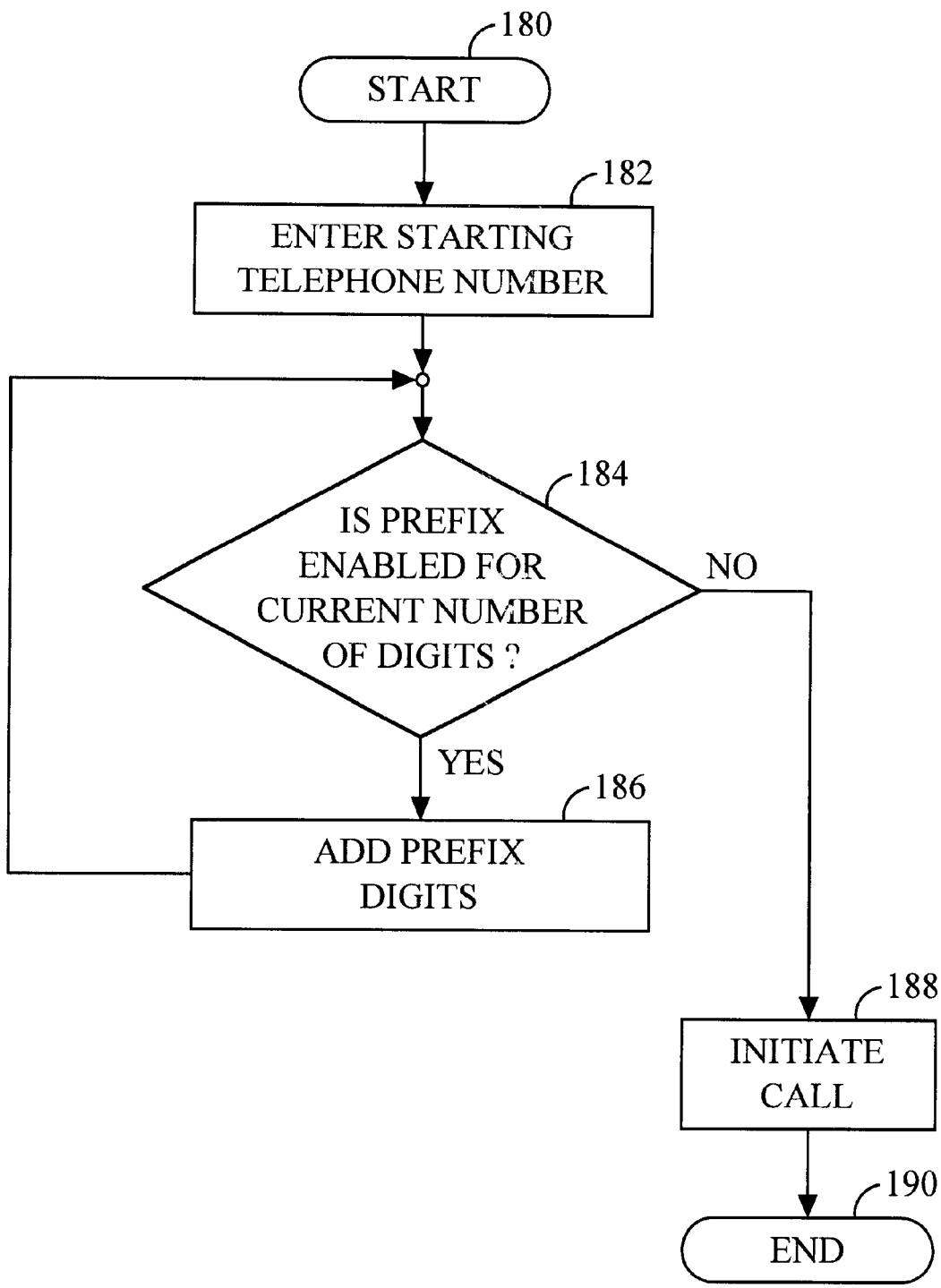
FIG. 4 is a flowchart illustrating the operation of the wireless communication device of FIG. 1 to automatically pre-pend prefixes to a destination telephone number.

The operation of the system 100 to automatically pre-pend prefixes to a partial destination telephone number is illustrated in the flowchart of FIG. 4. At a start 180, one or more prefix levels have been enabled by the user and the appropriate data entered in the manner illustrated in the flowchart of FIG. 3. In step 182, the user enters a destination telephone number using the keypad 118 (see FIG. 1) or by recalling a destination telephone number from the telephone number storage area 126. In step 184, the system 100 determines whether there is a prefix enabled for the current number of digits in the telephone number. If there is a prefix enabled for the current number of digits in the telephone number, the result of decision 184 is YES. In that case, the system 100 adds the prefix digits associated with the enabled prefix level in step 186. As discussed above, the system 100 can readily accommodate different numbers of digits entered by the user and different numbers of digits associated with each prefix level. For example, if the user enters 5 digits in step 182, and there is a prefix level enabled for a 5 digit telephone number, the result of decision 184 is YES and, in step 186, the system 100 adds the prefix digits (e.g., two digits) associated with the particular prefix level.

Following the execution of step 186, the system 100 returns to decision 184 where it determines whether there is a prefix enabled for the current number of digits in the telephone number. In the example discussed above, where two digits have been pre-pended to a 5 digit telephone number entered by the user, the system 100 determines whether there is a prefix enabled for a 7 digit telephone number. If necessary, this process is repeated for multiple additional prefix levels. If the user has entered a complete telephone number, or one or more levels of prefix digits have been pre-pended to the user-entered telephone number, the system 100 will reach a point where no prefixes are enabled for the current number of digits in the telephone number. In this case, the result of decision 184 is NO. At this point, a complete destination telephone number has been generated by the system. In step 188, the system 100 can initiate a call using the completed telephone number. The process ends at 190. Thus, the system 100 automatically adds multiple levels of prefix digits to generate a complete destination number.

The process illustrated in FIGS. 3 and 4 provides an exemplary embodiment of the system 100. However, those skilled in the art can appreciate that many alternative embodiments are also possible. For example, the automatic pre-pending of digits may be applied to any destination telephone number entered by the user so long as one or more levels of prefix pre-pending have been enabled. Alternatively, the pre-pending of prefixes may be applied only to the destination telephone numbers in the telephone number storage area 126. In yet another alternative embodiment, the user can independently add prefix levels to each of the destination telephone numbers in the telephone number storage area 126. In this embodiment, the user can enable the pre-pending of one or more prefix levels for a particular number in the telephone number storage area 126.

The system 100 will only pre-pend prefixes if the destination telephone number selected by the user matches the destination telephone number in the selected location in the telephone number storage area. Thus, the system can pre-pend prefixes for a specific telephone number whether entered by the user via the keypad 118 or using the telephone number storage area 126.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A method for pre-pending a prefix to a partial telephone number, comprising the steps of:
   (a) entering the partial telephone number into a wireless telephone;
   (b) counting the number of digits in the partial telephone number;
   (c) determining, from the number of digits, a prefix level which has been supplied to the wireless telephone;
   (d) determining the location of the wireless telephone;
   (e) determining, from the location of the wireless telephone, a prefix level which is required to operate the wireless telephone at the location of the wireless telephone;
   (f) determining, from:
      (1) the prefix level which has been supplied; and
      (2) the prefix level which is required; the number of digits in the prefix to be pre-pended;
   (g) determining, from:
      (1) the number of digits in the prefix to be pre-pended;
      (2) the partial telephone number; the prefix to be pre-pended; and
   (h) pre-pending the prefix to the partial telephone number.

2. Apparatus for pre-pending a prefix to a partial telephone number, comprising the steps of:
   (a) means for entering the partial telephone number into a wireless telephone;
   (b) means for counting the number of digits in the partial telephone number;
   (c) means for determining, from the number of digits, a prefix level which has been supplied to the wireless telephone;
   (d) means for determining the location of the wireless telephone;
   (e) means for determining, from the location of the wireless telephone, a prefix level which is required to operate the wireless telephone at the location of the wireless telephone;
   (f) means for determining, from:
      (1) the prefix level which has been supplied; and
      (2) the prefix level which is required; the number of digits in the prefix to be pre-pended;
   (g) means for determining, from:
      (1) the number of digits in the prefix to be pre-pended;
      (2) the partial telephone number; the prefix to be pre-pended; and
   (h) means for pre-pending the prefix to the partial telephone number.

* * * * *